United States Patent
Devine et al.

(10) Patent No.: US 10,628,420 B2
(45) Date of Patent: Apr. 21, 2020

(54) DYNAMIC VIRTUAL SERVICE

(71) Applicant: CA, Inc., Islandia, NY (US)

(72) Inventors: John Devine, Kings Park, NY (US); Anita Punreddy, Dix Hills, NY (US); Alex C. Arthur, Huntington, NY (US); Wing Li, Fresh Meadows, NY (US); Bo Gong, Hauppauge, NY (US)

(73) Assignee: CA, Inc., Islandia, NY (US)

( * ) Notice: Subject to any disclaimer, the term of this patent is extended or adjusted under 35 U.S.C. 154(b) by 729 days.

(21) Appl. No.: 14/974,098

(22) Filed: Dec. 18, 2015

(65) Prior Publication Data

US 2017/0177650 A1   Jun. 22, 2017

(51) Int. Cl.
*G06F 17/30* (2006.01)
*G06F 16/2455* (2019.01)

(52) U.S. Cl.
CPC .................. *G06F 16/2455* (2019.01)

(58) Field of Classification Search
USPC ........ 707/607, 609, 687, 705, 790, 813, 821
See application file for complete search history.

(56) References Cited

U.S. PATENT DOCUMENTS

| | | |
|---|---|---|
| 5,345,587 A | 9/1994 | Fehskens et al. |
| 5,450,586 A | 9/1995 | Kuzara et al. |
| 5,576,965 A | 11/1996 | Akasaka et al. |
| 6,122,627 A | 9/2000 | Carey et al. |
| 6,134,540 A | 10/2000 | Carey et al. |
| 6,810,368 B1 | 10/2004 | Pednault |
| 6,879,946 B2 | 4/2005 | Rong et al. |
| 6,883,162 B2 | 4/2005 | Jackson et al. |
| 6,957,199 B1 | 10/2005 | Fisher |
| 7,376,549 B2 | 5/2008 | Horikawa |
| 7,437,710 B2 | 10/2008 | Bau et al. |
| 7,487,508 B2 | 2/2009 | Fu et al. |
| 7,539,980 B1 | 5/2009 | Bailey et al. |
| 7,552,036 B2 | 6/2009 | Oslake et al. |
| 7,676,538 B2 | 3/2010 | Potter et al. |
| 7,783,613 B2 | 8/2010 | Gupta et al. |
| 7,805,496 B2 | 9/2010 | Aiber et al. |
| 7,873,594 B2 | 1/2011 | Harada et al. |
| 7,966,183 B1 | 6/2011 | Kryskow et al. |
| 8,060,864 B1 | 11/2011 | Michelsen |

(Continued)

OTHER PUBLICATIONS

Wikipedia, "Mock Object," Sep. 23, 2008, printed May 31, 2009, http://en.wikipedia.org/wiki/Mock_object, pp. 1-5.

(Continued)

*Primary Examiner* — Sana A Al-Hashemi
(74) *Attorney, Agent, or Firm* — Morgan, Lewis & Bockius LLP

(57) ABSTRACT

A request is received at a virtual service simulating a particular data service. The request includes a uniform resource locator (URL) that includes a service root portion and a resource path portion identifying a particular resource of a data structure. Syntax of at least the resource path portion is verified based on a particular protocol. Consistency of the resource path portion with a structure of a data model corresponding to the particular data service is also verified. A query of a database is performed based on contents of at least the resource path portion and a simulated response of the particular data service to the request is generated using results of the query.

20 Claims, 7 Drawing Sheets

(56) References Cited

U.S. PATENT DOCUMENTS

| | | |
|---|---|---|
| 8,112,262 B1 | 2/2012 | Michelsen |
| 8,538,740 B2 | 9/2013 | Kumar et al. |
| 8,898,681 B1 | 11/2014 | Acheff et al. |
| 8,935,573 B2 | 1/2015 | Horsman et al. |
| 9,201,767 B1 | 12/2015 | Tarlton et al. |
| 9,323,645 B2 | 4/2016 | Michelsen |
| 9,531,609 B2 | 12/2016 | Talot et al. |
| 9,727,314 B2 | 8/2017 | Michelsen et al. |
| 9,813,504 B2 | 11/2017 | Kumar et al. |
| 10,114,736 B2 | 10/2018 | Lau |
| 2001/0016876 A1 | 8/2001 | Kurth et al. |
| 2002/0010781 A1 | 1/2002 | Tuatini |
| 2003/0055670 A1 | 3/2003 | Kryskow et al. |
| 2003/0101436 A1 | 5/2003 | Kobrosly et al. |
| 2003/0217162 A1 | 11/2003 | Fu et al. |
| 2004/0078782 A1 | 4/2004 | Clement et al. |
| 2004/0128259 A1 | 7/2004 | Blakeley et al. |
| 2004/0162778 A1 | 8/2004 | Kramer et al. |
| 2004/0210663 A1* | 10/2004 | Phillips .............. H04L 67/1008 709/230 |
| 2004/0230674 A1 | 11/2004 | Pourheidari et al. |
| 2004/0243334 A1 | 12/2004 | Wrigley et al. |
| 2004/0243338 A1 | 12/2004 | Sabiers et al. |
| 2005/0027648 A1 | 2/2005 | Knowles et al. |
| 2005/0063335 A1 | 3/2005 | Shenfield et al. |
| 2005/0198401 A1 | 9/2005 | Chron et al. |
| 2005/0289231 A1 | 12/2005 | Harada et al. |
| 2006/0224375 A1 | 10/2006 | Barnett et al. |
| 2006/0235675 A1 | 10/2006 | Oslake et al. |
| 2007/0006177 A1 | 1/2007 | Aiber et al. |
| 2007/0033442 A1 | 2/2007 | Tillmann et al. |
| 2007/0073682 A1 | 3/2007 | Adar et al. |
| 2007/0169003 A1 | 7/2007 | Branda et al. |
| 2007/0261035 A1 | 11/2007 | Duneau |
| 2007/0277158 A1 | 11/2007 | Li et al. |
| 2008/0010074 A1 | 1/2008 | Brunswig et al. |
| 2008/0059625 A1 | 3/2008 | Barnett et al. |
| 2008/0120129 A1 | 5/2008 | Seubert et al. |
| 2008/0127093 A1 | 5/2008 | Fernandez-Ivern et al. |
| 2009/0064149 A1 | 3/2009 | Singh et al. |
| 2009/0094684 A1 | 4/2009 | Chinnusamy et al. |
| 2009/0119301 A1 | 5/2009 | Cherkasova et al. |
| 2009/0187534 A1 | 7/2009 | Broll et al. |
| 2009/0204669 A1 | 8/2009 | Allan |
| 2009/0234710 A1 | 9/2009 | Hassine et al. |
| 2009/0282403 A1 | 11/2009 | Poole et al. |
| 2009/0298458 A1 | 12/2009 | Bakker et al. |
| 2010/0017401 A1 | 1/2010 | Higuchi et al. |
| 2010/0037100 A1 | 2/2010 | Lopian |
| 2010/0145962 A1 | 6/2010 | Chen et al. |
| 2010/0318974 A1 | 12/2010 | Hrastnik et al. |
| 2012/0059868 A1 | 3/2012 | Buckl et al. |
| 2012/0084754 A1 | 4/2012 | Ziegler et al. |
| 2012/0246334 A1* | 9/2012 | Yang .............. H04L 67/2823 709/232 |
| 2012/0278872 A1* | 11/2012 | Woelfel .............. H04L 61/2596 726/7 |
| 2014/0108589 A1 | 4/2014 | Dhanda |
| 2014/0223418 A1 | 8/2014 | Michelsen et al. |
| 2015/0205699 A1 | 7/2015 | Michelsen |
| 2015/0205700 A1 | 7/2015 | Michelsen |
| 2015/0205701 A1 | 7/2015 | Michelsen |
| 2015/0205702 A1 | 7/2015 | Michelsen |
| 2015/0205703 A1 | 7/2015 | Michelsen |
| 2015/0205708 A1 | 7/2015 | Michelsen |
| 2015/0205712 A1 | 7/2015 | Michelsen |
| 2015/0205713 A1 | 7/2015 | Michelsen |
| 2015/0234731 A1 | 8/2015 | Williams et al. |
| 2015/0304389 A1* | 10/2015 | Chiussi .............. H04W 4/12 709/203 |
| 2016/0125052 A1* | 5/2016 | Dahan .............. G06F 17/30566 707/705 |
| 2016/0239409 A1 | 8/2016 | de Oliveira Staudt et al. |

OTHER PUBLICATIONS

Lisa, 2.0 User's Guide, Interactive TKO, Feb. 27, 2003, pp. 1-130.

Lisa, 2.0 Developer's Guide, Interactive TKO, Mar. 13, 2003, pp. 1-23.

Chapter 5—Service Discovery, Bluetooth Application Developer's Guide, 2002 (pp. 167-209).

Chatterjee, S., "Messaging Patterns in Service-Oriented Architecture, Part 1," msdn.microsoft.com/en-us/library/aa480027.aspx, Apr. 2004, (pp. 1-21).

Time to live—Wikipedia, the free encyclopedia; 2015; pp. 1-3. http://en.wikipedia.org/wikiiTime_to_live> examiner annotated document.

Web Discussion: "Is TCP protocol stateless or not?" available online at "http://stackoverflow.com/questions/19899236/is-tcp-protocol-statelessor-not" pp. 1-3 (2013).

* cited by examiner

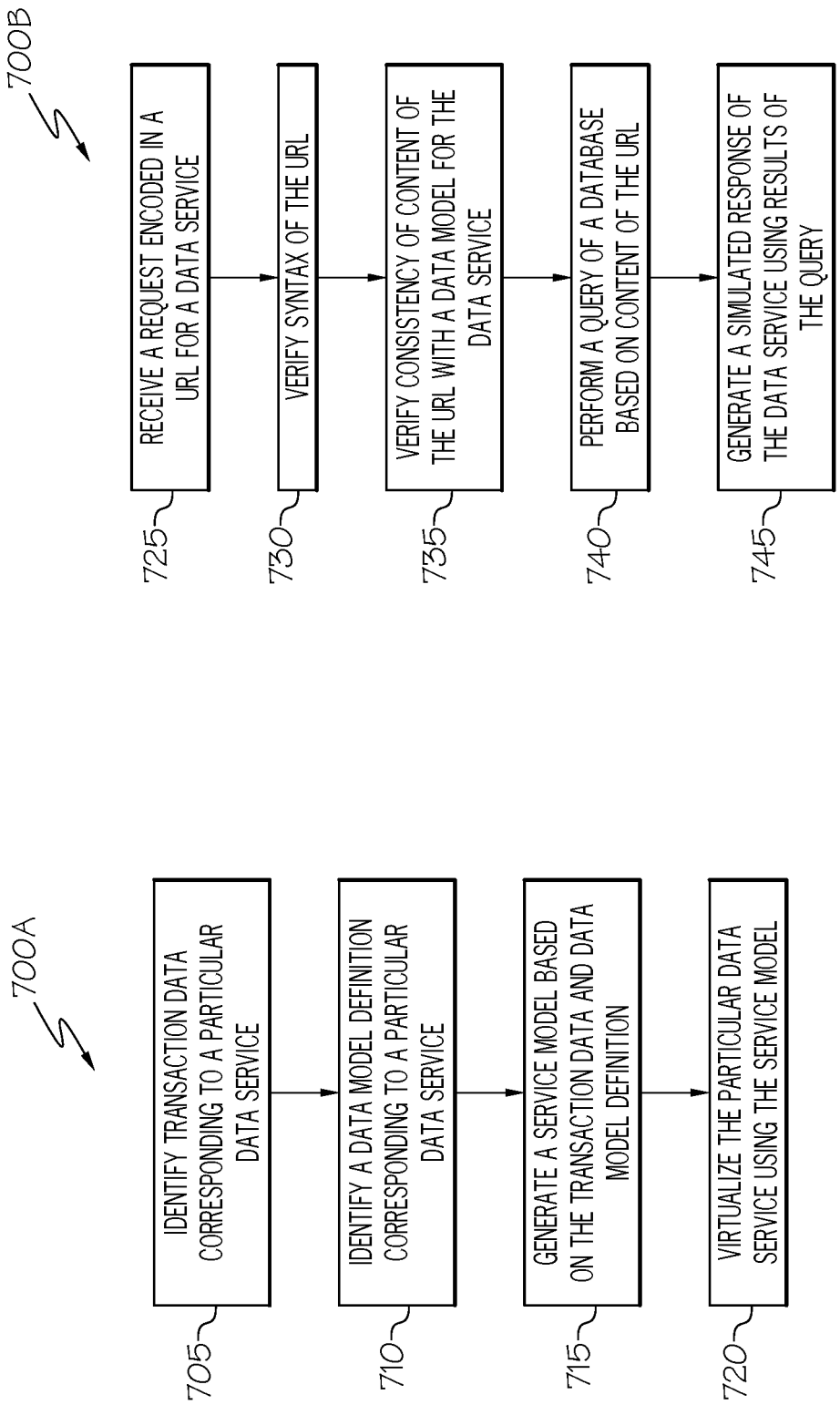

DYNAMIC VIRTUAL SERVICE

BACKGROUND

The present disclosure relates in general to the field of computer development, and more specifically, to simulating a dynamic software service.

Modern software systems continue to evolve and become more sophisticated, with some systems and programs designed to interoperate with, consume data or services from, or otherwise depend on other programs or applications. However, in instances whether the other programs or applications are not under the control of the entity controlling the particular program or application or otherwise constrained, such other programs and applications may not be available to the entity when testing of the particular program or application is desired. For example, an airline may be reluctant to test a new reservation application or client against the airline's live production database in order to avoid negatively impacting (e.g., in terms of database record values or database response time) actual consumer transactions that will be taking place at the same time as testing. Similarly, in order to reduce costs, a financial institution may wish to minimize interactions between a new credit card application system and a partner service due to per-transaction fees, such as those that are charged for each credit check, charged by the partner service. In yet another example, the constrained service may still be in development and thus not yet available to interact with the application under test.

BRIEF SUMMARY

According to one aspect of the present disclosure, a request can be received at a virtual service simulating a particular data service. The request can include an uniform resource locator (URL) that includes a service root portion and a resource path portion. The resource path portion can identify a particular resource of a data structure. Syntax of at least the resource path portion can be verified based on a particular protocol. Consistency of the resource path portion with a structure of a data model corresponding to the particular data service can also be verified. A query of a database can be performed based on contents of at least the resource path portion and a simulated response of the particular data service to the request can be generated using results of the query.

BRIEF DESCRIPTION OF THE DRAWINGS

FIGS. 7A-7B are simplified flowcharts illustrating example techniques in connection with virtualization of an example software component in accordance with at least one embodiment.

Like reference numbers and designations in the various drawings indicate like elements.

DETAILED DESCRIPTION

Figure 1:
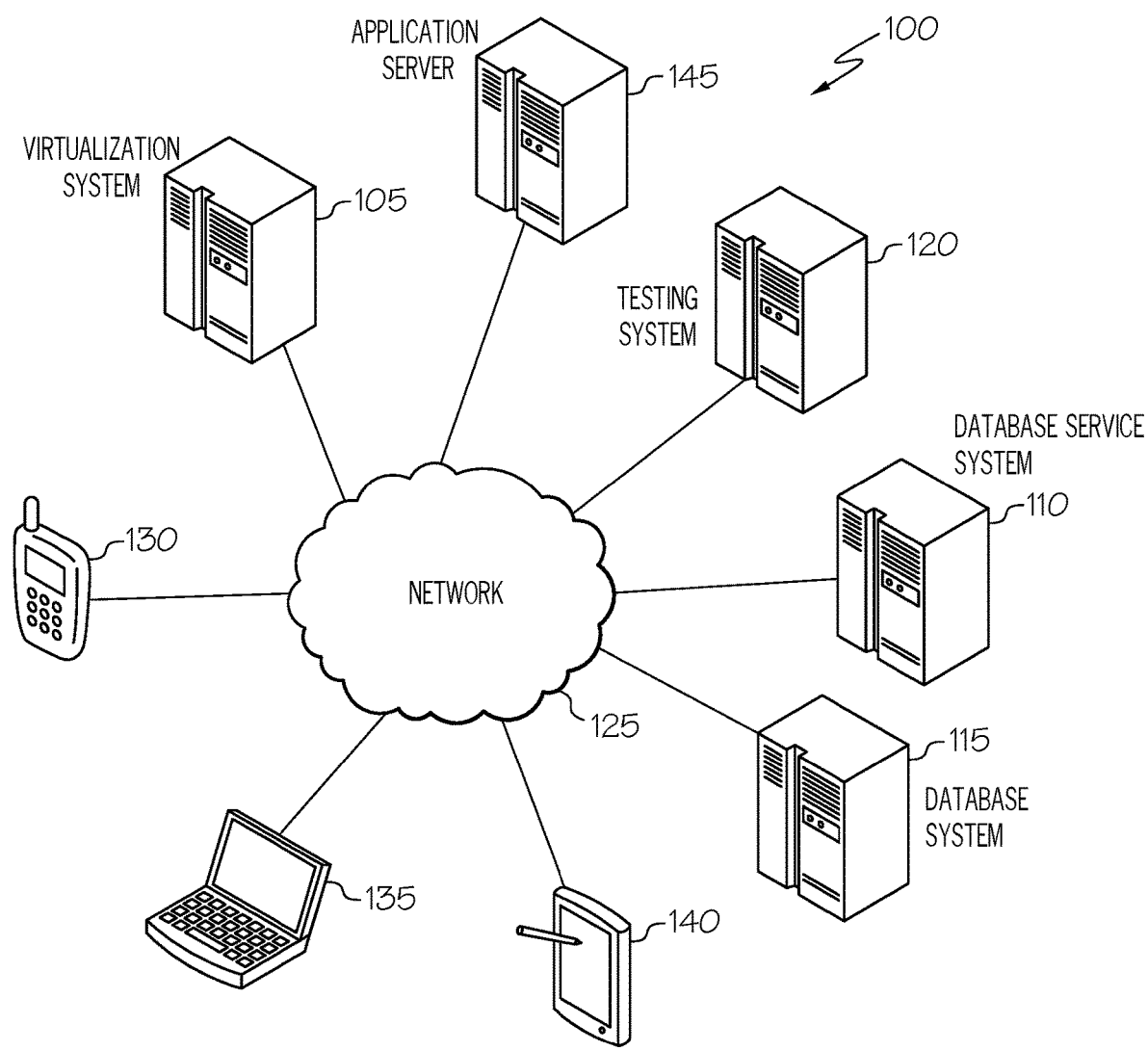
FIG. 1 is a simplified schematic diagram of an example computing system including an example virtual service system in accordance with at least one embodiment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or combining software and hardware implementations that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring now to FIG. 1, FIG. 1 is a simplified block diagram illustrating an example computing environment 100 including a virtualization system 105 and a data service system 110 to access and manage data of a database system 115. In some cases, the data service system 110 and database system 115 can be implemented as a unified system. The virtual service system 105 can permit the virtualization of one or more software component or systems, including data service system 110. The virtualization system 105 can construct and host a virtual service simulating operation of the component or system it virtualizes (e.g., all or a portion of data service system 110. The virtual service can stand-in for the full implementations of the real world software component it models and requests intended for the real world software component can be diverted to the virtual service which can generate simulated responses of the modeled software component that emulate the actual responses generated by the modeled software components. Further, the virtualization system can support virtualization of dynamic data services (e.g., services hosted by a data service system) and enhance the simulation of such data services by simulating full create, read, update and delete (CRUD) operations with persisted user data.

In some implementations, a virtual service can model software components not readily available for use with another software component upon which the other software component depends or with which the other software component is to interact. For instance, the use of a particular software component modeled by a corresponding virtual service may be desirable in connection with testing or development of the other software component (e.g., using testing system 120). Where the particular software component is constrained in that it is not available (e.g., offline, under maintenance, under development, etc.) or when it would otherwise not be desirable to utilize the actual particular software component, a corresponding virtual service can possess functionality allowing the virtual service to effectively stand in for the particular software component. For instance, such virtual services can be configured to generate value- and state-aware responses to requests received from a real world software component (such as a software component hosted by another mainframe system (e.g., 110, 115)), as well as model the performance characteristics of the modeled software component, among other examples.

Further, in some instances, applications (and other software components), including data services hosted by data service system 110, can additionally function to provide graphical user interfaces for users to interface with the application using one or more user computing devices (e.g., 130, 135, 140). Further, user computing devices (e.g., 130, 135, 140) can also be used to interface with virtualization system 105, for instance, to coordinate, edit, and provide further inputs in connection with the generation and maintenance of virtual service models simulating operation of one or more software components. For instance, users can edit the models, change assumptions or data relied upon by the models, among other examples. Additionally, user computing devices 130, 135, 140 can be used to select particular software components to be virtualized using virtual services generated by virtualization system 105 as well as select generated virtual services for deployment in one or more environments, including testing environments hosted by testing system 120, among other examples.

Upon launching a virtual service (using virtualization system 105) to virtualize one or more services (e.g., services hosted by data service system 110), client devices (e.g., 130, 135, 140) can be used to interface and transact with the virtual service itself, as it stands-in for the modeled service. For instance, a browser or other program hosted on the client device can send requests that are directed to the virtual service and the virtual service can generate simulated responses of the service it models and return these emulated responses to the requesting client device. In other instances, an application or computer system (e.g., hosted by application server 145) can be the requesting client of a modeled service and can interact with the virtual service (e.g., over one or more networks 125), among other examples.

In general, "servers," "clients," "computing devices," "mainframes," "network elements," "hosts," "system-type system entities," "user devices," and "systems," etc. (e.g., 105, 110, 115, 120, 130, 135, 140, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing device. For example, elements shown as single devices within the computing environment 100 may be implemented using a plurality of computing devices and processors, such as server pools including multiple server computers. Further, any, all, or some of the computing devices may be adapted to execute any operating system, including z/OS, z/VSE, Linux, UNIX, Microsoft Windows, Apple OS, Apple iOS, Google Android, Windows Server, etc., as well as virtual machines adapted to virtualize execution of a particular operating system, including customized and proprietary operating systems.

Further, servers, clients, network elements, systems, and computing devices (e.g., 105, 110, 115, 120, 130, 135, 140, 145 etc.) can each include one or more processors, computer-readable memory, and one or more interfaces, among other features and hardware. Servers can include any suitable software component or module, or computing device(s) capable of hosting and/or serving software applications and services, including distributed, enterprise, or cloud-based software applications, data, and services. For instance, in some implementations, a virtual service system 105, testing system 120, or other sub-system of computing environment 100 (such as an environment in which models are to be instantiated and run) can be at least partially (or wholly) cloud-implemented, web-based, or distributed to remotely host, serve, or otherwise manage data, software services and applications interfacing, coordinating with, dependent on, or used by other services and devices in environment 100. In some instances, a server, system, subsystem, or computing device can be implemented as some combination of devices that can be hosted on a common computing system, server, server pool, or cloud computing environment and share computing resources, including shared memory, processors, and interfaces.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

In some instances, a first software component can be dependent on another software component or system of software components. When the other software components are unavailable or otherwise constrained, use of the first software component can be impeded. For instance, if operation of the first software component in a test, a training environment, or development environment is to rely at least in part on the first software components interactions and interoperation with the other software component, the test, training session, etc. can be jeopardized by the unavailability of the other software component. In traditional systems, stubs or piecemeal responders could be manually developed by a team in an attempt to partially model responses of the unavailable software component. The development of such models, however, can be a time-intensive and expensive process as the entity conducting the testing, training, development, etc. is forced to divert valuable resources to the development of a stand-in component. Further, traditional stubs or responders are limited in their functionality in that they typically provide "dumb" or canned responses to requests, among other limitations. Additionally, in one example, dynamic data services reliant on data persistency can be difficult to model, or stub, as generic simulated response payloads may be insufficient to "convince" the client system that it is operating with a believable stand-in for the modeled service.

Figure 2:
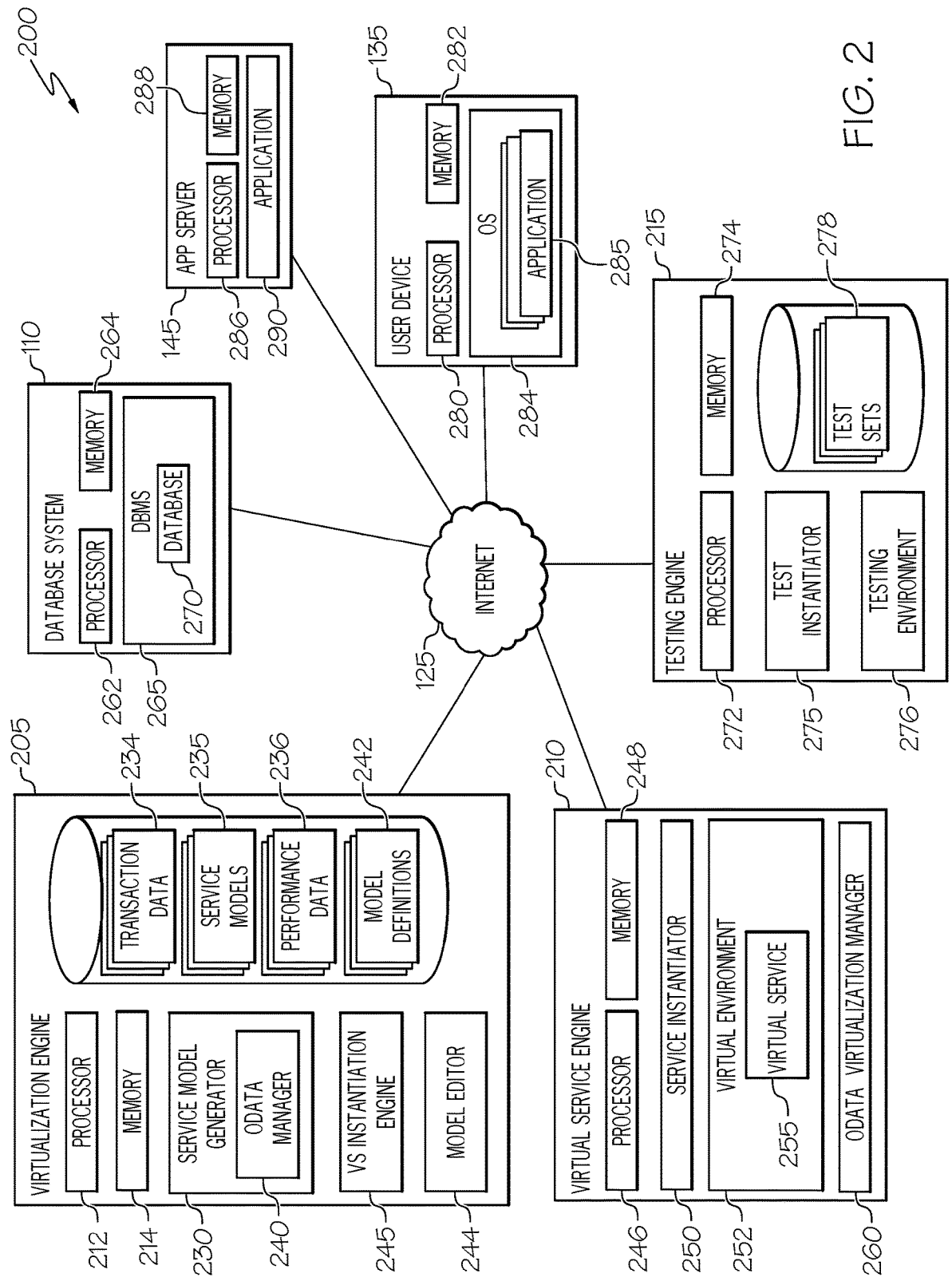
FIG. 2 is a simplified block diagram of an example computing system including an example virtualization engine in accordance with at least one embodiment.

At least some of the systems described in the present disclosure, such as the systems of FIGS. 1 and 2, can at least partially address at least some of the above-discussed issues, as well as others not explicitly described. For instance, turning to the example of FIG. 2, a simplified block diagram 200 is shown illustrating an example environment including a virtualization engine 205 adapted to generate service models that can be deployed as virtual services modeling one or more software components (e.g., applications or services hosted by a remote (e.g., online) software service). A virtual service engine 210 can also be provided through which the virtual services (e.g., 255) can be instantiated. Such virtual services can be used, for instance, in a test, facilitated using a testing engine 215, among other examples.

An example virtualization engine 205 can include, in some implementations, one or more processor devices (e.g., 212), one or more memory devices or elements (e.g., 214), and other hardware and software components including, for instance, service model generator 230, a virtual service instantiation engine 245, among other example components, including components exhibiting other functionality or components combining functionality of two or more of the above components, among other examples. A virtualization engine 205 can be used to generate and manage virtual services. Service models 235 can be generated, in some implementations, for processing by a virtual service engine 210 (using, for instance, a service instantiator 250) to construct a virtual service (e.g., 255) from service models (e.g., 235) generated by virtualization engine 205. The virtual service 255 can be executed and hosted within a virtual service environment 252, such as a virtual service environment implemented using one or more virtual machines or another environment.

A virtual service engine 210 can include one or more processor devices 246 and memory elements 248 among other software and hardware components. In some implementations, functionality of virtual service engine 210 can be combined with or included in functionality of the virtualization engine 205. For instance, in some implementations, virtualization engine 205 can both construct service models 235 as well as instantiate virtual services (e.g., 255) from those service models 235, among other potential implementations that may be used in the generation of virtual services.

In one example, service models 235 can be generated by virtualization engine 205 (e.g., using service model generator 230) based on detected requests and responses exchanged between two or more software components or systems (such as between a browser and a particular remote server, between the remote server and other remote backend servers such as a database system (e.g., 110), or even between software components within a single application or system, among other examples). Such request and response information can be captured, for instance, using software-based agents deployed within or between (e.g., in a communication path) software components in a system. Transaction data 234 describing such requests and responses, as well as characteristics of the requests and responses, can be generated by the agents or an agent manager interfacing with the agents. In some implementations, service model generator 230 can build service models 235 from transaction data 234.

Transaction data 234 can be collected from one or more monitoring tools (e.g., agents, agent managers, etc.) configured to gather data from logic, logically inserted within a communication pathway between a transacting client (or requester) software component and a server (or responding) software component. Transaction data 234 can also be obtained through other monitoring techniques, including the monitoring of appropriate queue(s) and topics for new messages being exchanged between a requester component and responding component communicating via messaging, intercepting method calls to a particular server component (e.g., object), and so on. Further, monitoring tools can also intercept responses from the responding software component and corresponding information in transaction data 234 can be generated that identifies those responses as corresponding to requests of a particular requester component, among other examples. Indeed, in some implementations, transaction data can be generated from an image captured by an agent that identifies a request-response pair, among other examples.

Transaction data 234 can further document attributes of requests and responses detected within a particular transaction. For example, a request can include an operation and one or more attributes. As an example, transaction data can identify a command to perform a login operation as well as attributes that include the user name and password to be used in the login operation. Accordingly, service model generator 230 can also parse requests identified in transaction data 234 in order to identify whether any attributes are present and, if so, to extract and store information identifying those attributes. Thus, information identifying a request in a corresponding service model (e.g., 235) can include information identifying a command as well as information identifying any attributes present within the request. Similarly, for responses, a service model generator 230 can parse transaction data to identify responses and response attributes (e.g., using protocol-specific configuration information in order to determine how to locate the attributes within the response) and incorporate such information in service models identifying the response.

Service models 235 can be used as the basis of virtual services modeling the software components providing the requests and/or responses modeled in the service models 235. Virtual services can capture and simulate the behavior, data and performance characteristics of complete composite application environments, making them available for development and testing at the request of a user or system and throughout the software lifecycle, among other advantages.

In some instances, a virtualization engine 205 can include functionality for the creation of complete software-based environments using virtual services that simulate observed behaviors, stateful transactions and performance scenarios implemented by one or more software components or applications. Such virtual services provide functionality beyond traditional piecemeal responders or stubs, through logic permitting the recognition of input/requests and generation of outputs/responses that are stateful, aware of time, date, and latency characteristics, support such transaction features as sessions, SSL, authentication, and support string-based and dynamic request/response pairs, among other features. Service virtualization and other virtual models can be leveraged, for instance, when live systems are not available due to project scheduling or access concerns. In cases where components have not been built yet, environments can employ virtual services to rapidly model and simulate at least some of the software components to be tested within an environment. Virtual services can be invoked and executed in a virtual environment 244 implemented, for instance, within on-premise computing environments, in private and public cloud-based lab, using virtual machines, traditional operating systems, and other environments, among other examples. In some implementations, virtualization system 205 and virtual services (e.g., 245) and other supporting components can utilize or adopt principles described, for example, in U.S. patent application Ser. No. 13/341,650 entitled "Service Modeling and Virtualization," incorporated herein by reference in its entirety as if completely and fully set forth herein.

In some implementations, when a service model is used to instantiate a virtual service, the virtualization process can involve comparing new requests generated by a requester (e.g., a client application under test or development) to the request information stored in a corresponding service model. For example, if a new request containing a particular command and attribute is received, the service model can be searched for a matching request that contains the same command and attribute. If a matching request is found, the virtualization process returns the response (as identified by information stored in service model) associated with the matching request to the requester.

In many situations, the requests provided to a virtual service will not be exactly the same (i.e., containing the same request as well as the same attribute(s)) as the requests identified in service model. For example, a request provided to the corresponding virtual service may contain the same request but a different attribute or set of attributes. A service model can further include information usable to handle these requests. For instance, transactions containing requests that specify the same command can be identified as being of the same transaction type. Alternatively, a set of transactions can be identified as being of the same type if all of those transactions have requests that include the same command as well as the same number and type of attributes. The particular technique used to identify whether two or more transactions are of the same type can be protocol specific, in some embodiments (e.g., classification of transactions can be at least partially dependent upon the particular communication protocol being used between the requester and the server).

In some implementations, the functionality of the virtualization system can be extended to support the virtualization of dynamic services that provide full create, read, update and delete (CRUD) operations with user data persisted to a relational database. Static virtual services, on the other hand, are virtual services that generate static responses based on pattern substitution (e.g., based primarily on patterns detected in transaction data). Such dynamic services can utilize specialized uniform resource locators (URLs) with syntaxes defined by a particular protocol to communicate a request of a data resource, and in some cases, one or more operations or filters to be applied to data related to or returned in response to the request. For any data resource, the variety of potential requests (and URLs) that may be sent (and observed) may be prohibitively large to allow for patterns to be reliably determined and virtualize the service using transaction data alone.

Accordingly, in one example, a service model generator 230 of a virtualization system (e.g., in virtualization engine 205) can be provisioned with a data service manager, such as an OData manager 240 to provide functionality for generating service models 235 and supporting data structures (e.g., model definitions 242) to instantiate virtual services (e.g., 255) to model and simulate operation of a corresponding data service (e.g., an Open Data (OData) protocol-compliant service (or "OData service")).

Dynamic virtual services can be defined without additional coding through the use of a configuration file. This configuration file may either be created directly by the end user, or generated from a RAML Service definition. Such simple creation of a virtualized dynamic service can allow very rapid prototyping and improved realism and flexibility in developing dynamic services (e.g., OData services). The configuration file, or "model definition" (e.g., 242), can be associated with, or included in the corresponding service model 235 and can be utilized by the virtual service engine 210 to provide the corresponding virtual dynamic service (e.g., 255).

In one implementation, OData services can be virtualized through a corresponding service model and virtual service instantiated from the service model. For instance, such as shown in FIG. 2, the virtualization system can be extended to support a dynamic OData virtual service by providing an OData manager 240 (e.g., within or as an extension to service model generator 230) that can be used, with service model generator 230, to generate a service model that links to, incorporates, or is otherwise based on a model definition 242 defined for a particular OData data structure (e.g., according to an OData data model). In one example, the service model can be embodied in a proprietary augmented Entity Data Model (EDM). In some instances, the service model for the OData service can contain the model definition 242. The model definition 242 can contain the definition of the specific OData objects included in and structure of the corresponding OData service's data structure including the respective Entity Sets, Entity Types, Navigation Properties, etc. that will be supported by the service. In some instances, the model definition 242 can further include an SQL schema corresponding to the OData data structure.

A virtual dynamic service, as with other virtual services, can be instantiated in a virtual service environment 252. In the case of a virtualize OData service, OData service requests can be intercepted, redirected, or otherwise passed to an OData virtualization manager 260 (e.g., installed in the virtual service environment or virtual service engine 210). In one implementation, the OData virtualization manager 260 can be embodied as a runtime component which can utilize a hot deploy mechanism of the virtualization system to make itself accessible within a virtual service environment 252.

When a user, such as a human user through a browser or other application (e.g., 285) or a client application (e.g., 290), performs OData operations against the OData virtual service, the VSM can pass an OData request URL, and any request body to the run-time extension. The OData virtualization manager 260 can be used to support interpretation of the request URL and generation of a corresponding emulated response of the modeled OData service. For instance, the OData virtualization manager 260 can inspect the request URL to validate the URL against the general OData syntax as well as the specific OData schema defined in the corresponding model definition 242. If the OData virtualization manager 260 determines that the request URL is valid, the OData virtualization manager 260 can then transform the received request into a semantically identical database query (e.g., SQL), which is executed against a relational database 270 (e.g., through a database management system 265 hosted by a database system 110. In some implementations, the database system can be a third-party and/or remotely hosted system (e.g., including one or more processors 262 and one or more memory elements 264). The database management system 265 can return a response to the database query generated by the OData virtualization manager 260. The OData virtualization manager 260 can generate the emulated responses from the results returned from the database 270. For instance, the OData virtualization manager 260 can determine the appropriate success or failure status and fabricate a corresponding response body consistent with an OData response generated by the virtualized OData service. The OData virtualization manager 260 can then return this emulated result to the requesting client (e.g., 135, 145).

A database system 110, such as in the example shown in FIG. 2, can include one or more processor apparatus 262 and one or more memory elements 264, and (in some cases) a database management system 265. The database system can host a database 270 to be used by one or more virtual services (e.g., 255) provided and instantiated by a virtualization system to support data persistency during the virtualization of one or more data services. The database 270 can be a relational database, and the virtual service can write, delete, or change data to the database 270 in accordance with received requests and access these changes from the database to generate emulated responses. Further, each time a particular instance of virtual data service is relaunched, the database (or portion of the database) used by the virtual service can be reloaded or accessed to allow further simulated transactions, such as in subsequent tests (e.g., by testing engine) utilizing the virtual service.

In one example, a testing engine 215, can include one or more data processors 272, one or more memory elements 274, and components, implemented in hardware and/or software, including, as examples, a test instantiator 275 and testing environment 276. Test instantiator 275 can be used to load one or more predefined test sets 278 that include, for instance, data for use in causing a particular software component under test to send a set of requests to a server software component. In some instances, the server software component (or server system hosting the server software component) can be replaced by one or more virtual services provided through virtualization engine 205. Test sets 278 can include additional instructions and data to cause the one or more virtual services to be automatically instantiated (e.g., using virtual service instantiation engine 250 and/or virtual service engine 210, etc.) for use in the test. Further, test sets 278 can also identify particular conditions to be applied in the tests of the particular software component, including the identification of particular performance characteristics to be used to model particular conditions within the test, the data structure to be used by a modeled data service, the database to be used by the virtual service in the test, among other examples.

Further components of system 200 can include client systems such as user device 135 and application server 145, among other examples. In the case of user device 135, one or more processor devices (e.g., 280) can be provided as well as one or more memory elements 282. The user device 135 can further include an operating system 284 through which one or more applications (e.g., 285) can be run. At least some of the applications 285 can interface with virtual services (e.g., 255) provided through a virtualization system (e.g., a browser application to interface with the virtual service over one or more networks (e.g., 125)). Similarly, application service 145 can also host applications (e.g., 290) that can interface with the virtual services. An application system 145 can include one or more processor devices (e.g., 286) and one or more memory elements 288, among other components (e.g., interfaces for connecting to and communicating over one or more networks 125), among other example features.

As noted above, a virtualization service can be provided to generate and host virtual services that model dynamic data services, such as OData data services. In some implementations, an OData dynamic virtual services can be generated that behave as real OData services. The virtualized OData service can be used to POST, PUT, and DELETE to create, modify, or delete OData Entity Instances (records) hosted on an actual database as the real OData service would. Subsequent data retrieval from the database using the virtual OData service (e.g., through GET) can then reflect these updates. Virtualized OData services can emulate real OData services according to the OData Minimal Conformance Level including, in some implementations, intermediate and advanced features. Development and quality assurance teams can utilize dynamic virtual services to enable the creation and use of repeatable tests for applications that involve OData services without requiring an instance of the actual OData service.

In OData, a resource is anything in the data model that can be addressed (e.g., an entity set, entity, property, or operation). Entity sets are named collections of entities (e.g. Customers is an entity set containing Customer entities). An entity can be a member of at most one entity set. Entity sets provide the primary entry points into the data model. Entities are instances of entity types (e.g. Customer, Employee, etc.). Entity types are nominal structured types with a key. Entities consist of named properties and may include relationships with other entities. Entity types support single inheritance from other entity types. Entities are the core identity types in a data model. Entities and entity sets are relatable types. Relationships have a name and are used to navigate from an entity to related entities. Relationships are represented in entity types as navigation properties. Relationships may be addressed directly through a navigation link representing the relationship itself. Each relationship may have a cardinality. Properties declared as part of the entity type's definition are called declared properties. Operations allow the execution of custom logic on parts of a data model. Functions do not allow side effects and are composable. Actions allow side effects and are not composable. Actions and functions are global to the service and may be used as members of entities and collections of entities.

CRUD operations of a dynamic service, such as an OData service, can utilize HTTP methods, such as POST, GET, PUT, and DELETE, to create, read, update, and delete OData entity instances (records). In some cases, requests can further include a request body. An OData virtualization manager 260 can interpret request URLs that include such methods.

In the case of OData services and service virtualization, POST can be used when creating records. The resource URL can be an entity set URL. The resource can also be a URL whose final segment is a navigation property that points to a collection of entity types. In the second case, an implicit linkage can be made between the entity instance (record) whose navigation property was used, and the new record. In each case, the call includes a request body (e.g., in JSON format) that contains at least one property for the entity type the resource path resolves. The key and required properties must be present, except for those key and required properties the virtual service's model definition 242 defines as automatically generated. In OData syntax, property names are in double quotes and are case-sensitive. Property values for string and date time types are also in double quotes. Numeric and Boolean types can either be quoted or unquoted. The presence of an invalid property name causes the request to fail (e.g., and an emulated error status message to be generated (e.g., status 400)). A deep insert can also be performed, for instance, by optionally including in the request body the additional record data for other new records to be created simultaneously as the parent record. Each of these records can be implicitly linked through a navigation property in the parent record. A virtual OData service can emulate a result of a POST. For instance, in a successful POST, the virtual service can cause a new record to be created and status 201 to be returned. The response generated by the virtual service can further include the result of the POST echoed back in the response body.

In the case of OData services and service virtualization, GET can be used to return either single Entity Instances (records), or Collections of records, and in concert with $expand can return records or Collections of records from multiple resource paths. Data that reaches a resource path can be returned, for instance, in JavaScript Object Notation (JSON) format, with scope and presentation of the returned data capable of being further controlled through System Query Options $filter, $select, $format, $top, $skip, $count and $orderby, and also by certain request headers, among other examples. A successful GET can further return status 200 OK. Accordingly, virtual services of an OData service can generate comparable responses based on the contents of the request URL to emulate responses of an actual OData service.

Further, in some instances, GET can also result in a single property being returned (e.g., by the actual OData service or a virtual service modeling such an OData service) when the resource path resolves to one specific property instance. If this property is not a collection, or a complex property, $value can be used in the URL to limit response to only the value data (e.g., $value). GET can also be used to return a service document, or metadata about the OData service. See Service Document and $metadata for more information.

In addition to POST and GET, in implementations of OData, PUT can be used to perform a full update in-place of an update of a single record. In one example, the request body can be in JSON format, with all required properties present. A successful PUT may, by default, return no response body and have a return code of 204 No Content. If a Prefer request header is specified and contains the value return=representational, then the updated record is returned, and the return code may be 200 OK. Further, DELETE can be used to delete a single record. DELETE can also be used to set individual properties to null or collection properties to an empty set. A successful DELETE returns status 204 No Content. Corresponding virtual services simulating a live OData service can generate emulated responses accordingly.

For any OData service virtualized by virtualization system, all resource paths that originate from an entity set and pass through the navigation properties can be supported in implementations of corresponding virtual services. The virtualization system can calculate the valid paths using a model definition associated with a corresponding virtual service model. Calls against the virtualization can use URLs that pass through any number of Navigation Properties (NPs) to any depth, as long as the NPs are valid for the type containing the NP, and the path is syntactically valid per OData standards. For example, OData may permit navigation properties to collections that are not qualified by a key as the last resource segment of a URL. The virtual service (as supported by a corresponding virtualization system) can correctly return an error when processing a URL that violates that rule.

Navigation properties can be defined as either one way or bidirectional. Properties can map one to one, one to zero or one, one to many, many to one, or many to many relationships between entity instances (records) that can be in the same or different entity sets. Resource paths can terminate in a resource that resolves to either an entity set, an entity type instance (record), a single entity type instance property, or a collection property. Certain keywords can also appear in resource paths that resolve to use-defined resources. Specific instances within an entity set or a navigation property that resolves to an entity set can be selected by appending (keyvalue) or (keyprop=keyvalue) to the resource segment.

TABLE 1

Resource Path Keywords

| Keyword | Description | Result |
|---|---|---|
| $value | $value is used with GET and is the last segment in the resource path. As a Single Property request, the Resource path (URL) resolves to a single Property instance. For example: http://myVSEserver:8769/mybaseresourcepath/myEntitySet('A_Key_Value')/anEntityProperty/$value | Causes response body to be simply the value of the requested Property, in text/plain form without any surrounding JSON formatting. |
| $count | $count (resource path keyword) can only be used with GET and must be the last segment in the resource path. The resource path must otherwise resolve to a collection (a set of zero or more records). For example: http://myVSEserver:8769/mybaseresourcepath/myEntitySet/$count | Causes response to be the integer count of the number of matching items in text/plain form without any surrounding JSON formatting. The value that is returned reflects the effect of any $filter, $skip, and $top System Query Options present as parameters. |
| $ref | $ref can be the last segment in the resource path. $ref changes the meaning of the URL from referring to the object to a reference of the object. $ref can be used with POST, PUT, and DELETE, and can be used to manage navigation links between entity instances. | Returns a Status 204 "No Content" on success. |
| $link | $link functions similar to $ref, although the $link keyword appears before the last resource path segment, which is to be a navigation property. | Both return a Status 204 "No Content" on success. |

In one implementation, a virtualization system supports virtualization of OData services utilizing System Query Options (SQOs). SQOs are parameters added to an OData URL to control aspects of the data. Some of the parameters are only valid with GET. SQOs are keywords that appear after the ? that terminated the resource path portion of the OData URI from the parameter portion. Each SQO has an argument which is separated from the keyword by "=". Multiple SQOs can be specified in a URL by separating them with &. Each SQO can only appear once for a given resource path.

TABLE 2

System Query Options

| Query Option | Description |
|---|---|
| $format | Controls the representation of the data in the response body. For instance, the virtual service may emulate an OData service by returning response bodies in JSON format. URLs containing the $value, and $count keywords return data as text/plain. The virtualization system can use a valid default for each request. Setting the data format may not necessarily be required. Format can also be specified in the request header. |
| $filter | $filter can be used (e.g., with GET) to restrict the data returned to only those records which meet certain criteria. The argument to $filter may be a logical expression that is comprised of references to properties in the entity pointed to by the current resource path context, or that can be reached through navigation properties from the current resource path context, filter operators, filter functions, and/or literals. $filter SQOs may only affect the resource for the resource path context in which they are declared. Requests that reference multiple entities can have separate $filter SQOs applied to each resource (see $expand).<br>Example 1 - Return only those books that fit on a 10 inch high shelf:<br>. . ./Books?$filter=Size/Height lt 10<br>Example 2 - Return only those books which have a cost less than 20.00 dollars and written by Dickens:<br>. . ./Books?$filter=ListPrice lt 20.00 and Author/Name eq 'Charles Dickens' |
| $select | $select controls which properties are returned in the response body. $select can be used with GET and can appear as a subsidiary parameter for $expand. Argument to $select may either be a comma-separated list of property names, or the asterisk ('*') character. $select may be a shortcut equivalent to a list of all non-navigation properties. The property names should be valid for the entity type corresponding to the resource path against which $select is applied.<br>Example 1 - Return the title and synopsis for each book<br>. . ./Books?$select=Title,Synopsis<br>Example 2 - Return the name title and synopsis for each book which weighs over two pounds (e.g., multiple SQOs in a request)<br>. . ./Books?$select=Title,Synopsis&$filter=Weight gt 2.0 |

TABLE 2-continued

System Query Options

| Query Option | Description |
| --- | --- |
| $orderby | $orderby allows control of the order in which records are returned. Keywords can be used to specify the sort order of low to high.<br>Example 1 - Return the title, synopsis, and list price for each book that is ordered from the lowest list price to the highest list price:<br>.../Books?$select=Title,Synopsis,&$orderby=ListPrice<br>Example 2 - Return the title, synopsis and list price for each book ordered from the highest list price to the lowest list price, and sort ties by title in ascending order. The asc keyword is optional:<br>.../Books?$select=Title,Synopsis,ListPrice&$orderby=ListPrice desc,Title asc |
| $skip | $skip takes as an argument an integer which is the number of otherwise qualifying records to pass over and omit from the response body. $filter is applied to the result set before $skip when determining the result set in the response. When counting records for $skip, the record at the same level as $skip and any records nested within that record due $expand are counted as one record.<br>Example - Fetch the name and description for all authors, but skip the first three authors.<br>.../Authors?$select=Name,Bio&$skip=3 |
| $top | $top allows the user to restrict the number of records returned by specifying the maximum number of records to return as an argument.<br>Example 1 - Fetch the title and list price for all books whose list rice is less than 50.00 but skip the first three books, and only return a maximum of five books:<br>.../Books?$select=Title,ListPrice&$filter=ListPrice lt 50.00&$skip=3&$top=5<br>Example 2 - Same as previous example, but include the comments on the books. The same number of books is returned with selected properties from the comment records on these books.<br>.../Books?$select=Title,ListPrice&$filter=ListPrice lt 50.00&$skip=3&$top=5&$expand= Comments ($select=CriticName,Comment) |
| $expand | $expand allows a user to request related data from multiple Entity Sets. $expand accepts a comma-separated list of resource paths composed of navigation properties originating from context in which the $expand is specified. Each top-level record is returned with child record data nested within it. If an expand resource path traverses several entities, all entities traversed are expanded, and data for each entity at a deeper level is nested within the parent record in the level above. The virtual service can ignore a $ref keyword that is the last segment of an $expand resource path argument. Resource paths arguments can be used to expand to specify System Query Options to apply only to that resource path. These options appear within parenthesis directly after the resource path, with multiple System Query Options separated by a semicolon(";"). The System Query Options supported DVS within $expand are $filter, $select, $top, $skip, and $orderby.<br>Example 1 - Return all the author records with book records nested under each author. Authors is an entity set, and books is a navigation property in entity type author:<br>.../Authors?$expand=Books<br>Example 2 - Return all the book records for author('101') with the comment records for each book nested under each author. Authors is an entity set. Books are a navigation property in entity type author. Comments is a navigation property in entity type book:<br>.../Authors('101')/Books?$expand=Comments |
| $count | The $count keyword can be used in two ways within OData. It can be used as part of a resource path, or as a System Query Option. As a System Query Option it allows the<br>user to control whether @odata.count is part of the response body. If the argument to $count is true, then @odata.count is returned and has a value of the integer count of the qualifying records. The count is affected by $filter but ignores the effect of $skip and $top. This number does not reflect the actual number of records in the response body.<br>If $count is absent or has an argument of false, then @odata.count is omitted from the response.<br>Example 1 - Fetch the title and list price for all books whose list rice is less than 50.00 but skip the first three books, and only return a maximum of five books. Include the count of all qualifying records:<br>.../Books?$select=Title,ListPrice&$filter=ListPrice lt 50.00&$skip=3&$top=5&$count=true<br>While a maximum of five records are returned due to $top, the @odata.count value reflects the full number of records that match the $filter restriction, and that would have been returned if both $top, and $skip were absent. |

Implementations of a virtualization system can provide virtual services that support various $filter operators. Sub-expressions can be grouped using parenthesis to override precedence. Operators can be processed in precedence level order (level 1=highest priority). Operators within an expression with equal precedence are evaluated left to right.

TABLE 3

Filter Operators

| Operator | Description | Precedence Level |
| --- | --- | --- |
| mul | Arithmetic multiplication. Arguments must be of numeric types. | 1 |
| div | Arithmetic division. Arguments must be of numeric types. Right Argument of zero will fail query and return a status 500 | 1 |
| mod | Arithmetic modulo. Arguments must be of numeric types. Right Argument of zero will fail query and return a status 500 | 1 |
| add | Arithmetic addition. Arguments must be of numeric types | 2 |
| sub | Arithmetic subtraction. Arguments must be of numeric types. | 2 |
| eq | Compare arguments and evaluate to true if arguments are equal | 3 |
| ne | Compare arguments and evaluate to true if arguments are not equal | 3 |
| gt | Compare arguments and evaluate to true if Left argument Greater than Right Argument | 3 |
| ge | Compare arguments and evaluate to true if Left argument Greater than or equal to Right Argument | 3 |
| lt | Compare arguments and evaluate to true if Left argument Less than Right Argument | 3 |
| le | Compare arguments and evaluate to true if Left argument Less than or Equal to Right Argument | 3 |
| not | Logical not. Evaluates to true if right argument is false, evaluates to false if right argument is true | 4 |
| and | Logical and. Evaluates to true if both arguments are true | 5 |
| or | Logical or. Evaluates to true if either argument is true | 6 |

Implementations of a virtualization system can provide virtual services that further support nearly the full set of filter functions and operations. For instance, filter functions such as string functions (e.g., contains(string, substring)), data and time functions (e.g., year(DateTimeOffset), minute(DateTimeOffset), etc.), mathematical functions (e.g., round (decimalValue), etc.), among other examples, may be included within a request URL.

In addition to the headers described under $format, a virtualization system (and the virtual services it provides) can support or generate the following headers:

TABLE 4

OData Headers

| Header | Description |
| --- | --- |
| OData-Version | OData-Version can be provided as a request header. Value should resolve to a number. DVS checks this numeric value against the OData version the target virtual service is configured to emulate, and if versions are not equal the request is rejected with status 400, and a message indicating what OData version is supported. Odata-Version can be returned as a response header. |
| OData-MaxVersion | OData-MaxVersion may be provided as a request header. Its value is ignored if OData-Version is also present. If OData-MaxVersion has a value that resolves to a number equal to or greater than the OData version the target virtual service is configured to emulate, then the request passes, but is otherwise rejected with status 400. A message indicating the OData version the target VS is configured to emulate. |
| Prefer | By default POST returns a response body containing the newly created entity in JSON format, while PUT and by default, PATCH responds with a 204 No Content. Prefer headers allow explicit control of this behavior. Prefer header can include return = minimal; return = representational; among others. |

The entities of a data model to be used in a virtual service can be defined to have one or more automatically generated property values. Property values can be configured to be generated once when the entity instance is first created using POST, or for every update. The virtualization system can further support virtual services, which support a REST API that allows saving the current set of entity data out to a file or loading of the entity data from a file. This feature is useful when there is a need to reset data to a known state for testing.

The virtualization system can further support adding custom properties (CPs) at runtime for entity sets whose entity type has the feature enabled.

In one implementation, an OData manager (e.g., 240) can be implemented as an Eclipse plug-in capable of being used to create service models (e.g., implemented as MAR files). The service model can link to, contain, or otherwise utilize a model definition corresponding to a defined data structure. In some cases, the OData manager can be deployed on the same system as the virtualization engine and/or virtual service engine, although in some implementations the OData manager can be hosted on a system remote from the remainder of the virtualization system. CA Virtual Service Environment (VSE) that the OData Dynamic Virtualization is deployed to DevTest is not required to be installed.

A model definition can specify the model of an OData data structure. An OData virtualization manager (e.g., 260) can utilize the model definition to interpret requests received by a virtual service modeling a corresponding OData service. Rather than using the specific paths of a request URL, the OData virtualization manager utilizes the model definition of the modeled service to resolves the resource paths of any depth. A model definition, in one implementations, can have be embodied with a file format is similar to a standard EDM but with extensions to configure the file to be used to virtualize a service using the virtualization service.

A model definition (e.g., 242) can describe the metadata of all the entities exposed by the virtual service. In one implementation, many of the elements in a model definition (e.g., 242) (e.g., an XML model) can have a name attribute. The values for these attributes can conform to the requirements for a JSON identifier. Typically, each element type can have a different name space. It is possible for the same name to be used for an entity set, entity type, and a property (e.g., "Personnel"). Further, property and navigation property can share the name space within the scope of the same parent element. In one example, the primary elements in a model definition can be EntitySet, EntityType, and Association. Property and NavigationProperty elements can help define the EnityType. The schema element provides information that is relevant to the corresponding virtual service. ComplexType allows other properties to be grouped for reference and EnumType allows definition of a property with values restricted to members of a set of valid values.

In one example, the schema element is the parent element for the entire configuration defined by the model definition and holds information for the configuration as a whole. For example:

Namespace specifies the name for the scope of the EntityType and EntitySet definitions in a reversed internet domain style similar to Java packages. For example, com.ca.example.Bookshop.

The optional attribute Alias is a shorthand version of namespace, and generally is equal to the last segment of the namespace value. When there is a need to qualify a name with a namespace, such as when specifying the value for the type attribute within a property element, or the value for odata.type in a POST, the value of Alias can be used to refer to items declared in this model. If absent, DVS assumes that the last segment of the namespace value is the alias. As a best practice is to explicitly include this.

Version can be set to a value of the form n.m., where n is an integer major version and m is an integer minor version. The major version can be incremented whenever there is a significant change in the format of the model definition itself. The minor versions can be used to track changes to the specific version of the namespace being defined.

An EntitySet can define one of the resources available from the virtual service. Each EntitySet can reference one EntityType. For instance:

The Name attribute value can be the name of the collection sets that are the first URL segment after the base path. By convention the name that is used is the plural of the Entity Type Name. For example, to define a collection of books, the Entity Type can be given the Name of Book and the Entity Set the Name of Books. Although, the name space for Entity Sets and Entity Types are separate they can share the same name.

The EntityType attribute is the Name of the EntityType for this EntitySet.

An EntityType element and its nested elements can specify the details about the structure of a resource and maps to a TABLE in the underlying database (e.g., 270). In most cases, an EntityType references a single EntitySet, although it does not have to be. Hidden EntityTypes can be provided in the specific case of supporting many to many relationships where the most efficient representation is to have an internal table that contains the keys for the two Entities being associated. For instance:

The Name attribute value can be the identifier that is used when referring to the EntityType.

The optional DBTable attribute allows specification of the name of the TABLE supporting the EntityType.

The optional CustomPropertiesEnabled attribute if set to the value true enables the run-time addition of custom properties to this Entity Type to customize the Entity Type (e.g., define a new entity type) in a way that distinguishes it from its implementation in the OData standard. For instance, through a custom property, a user can change the definition of one or more Entity Types.

The optional CustomPropertiesName attribute allows specification of the name of a special collection property that contains a set of name value pairs for the custom properties if CustomPropertiesEnabled is set to true.

An EntityType can contain one of more nested property elements, and zero or more NavigationProperty elements. The Property element can describe the individual data items that comprise the resource and map to a database COLUMN within the TABLE. For instance:

The mandatory Name attribute is simply the name for the data item.

The mandatory Type attribute specifies the format of the data. Types can be either base Types, Complex Types, EnumTypes or Collections of base Types, Complex Types, or EnumTypes.

The following supported base types may include such examples as:

"Edm.String" a text string."Edm.Boolean" a Boolean value"Edm.Date" a date value. Input format is 'YYYY-MM-DD', for example: '2014-09-15'.

"Edm.DateTimeOffset" a date-time value. Full Input format is 'YYYY-MM-DD[T]HH:MM:SS.sss[+−] ZZZ', for example, '2013-10-21T12:10:43.123' format.

"Edm.Decimal" a decimal numeric value (for example, 3.14).

"Edm.Double" a double (floating-point) numeric value.

"Edm.Int32" an integer numeric value.

The NavigationProperty element can describe the relationships between EntityTypes and defines the allowable navigation from this EntityType. For instance:

The Name attribute is the identifier of the NavigationProperty.

The Type attribute specifies the name of the destination EntityType in the navigation.

The Relationship attribute specifies the name of the association that contains the database implementation details for the navigation. In cases where two-way navigation is allowed between two entity types, each EntityType may have a NavigationProperty containing the same relationship value.

The Multiplicity attribute specifies if there can be multiple entity instances of the targeted entity type reachable through this navigation (" "), or zero or one instances ("0 . . . 1"). For instance, in an example Books NavigationProperty, the Author EntityType has a "{ }" Multiplicity value, because any single Author can potentially have written multiple books. On the other hand, the Inventory NavigationProperty in the Book EntityType may have a Multiplicity value of "0 . . . 1", because in the model that is used for in this example, a Book record is associated with only one Inventory record.

An Association element can specify the implementation details of one (for unidirectional navigations), or two (for bidirectional navigations) Navigation Properties. Attributes may include, for instance:

The Name attribute matching the Relationship value for the affiliated navigation properties.

The DBLinkTable attribute of the name of one of the EntityType TABLE names when the navigation is one to one or one to many. If the navigation is many to many, then this value can be the TABLE name of the intermediate table which holds the keys of the two Entities that are the end points of the navigation.

The DBJoinOn attribute can be a list of one or more JOIN pairs of the form TABLE1. COLUMN1=TABLE2. COLUMN2.

In one example, the EnumType can be provided as a way of declaring a data type that only accepts certain values. Attributes can include:

The Name attribute.

The optional attribute UnderlyingType which can have the value of any integer type or Edm.String. If absent the default is Edm.String. This controls the type of the database column that is created for any properties declared to use the EnumType.

In addition, an EnumType declaration can include one or more member elements. Each member element can include a name attribute, which is used as one of the permissible values for Properties declared to use the EnumType, and an optional value attribute, whose value is the numeric sort weight that is given to this member.

In one example, a ComplexType can be provided by which related properties can be grouped and referenced as a whole. Attributes can include:

The name attribute.

In addition, a ComplexType declaration can include one or more property elements.

The generation of a model definition can include the definition of top-level schemas (or metadata) containing type definitions for all EntityTypes and EntitySets. The schema file can be examined to identify how the model definition maps to the corresponding database schema. In some examples, schemas can conform to a defined schema format (e.g., a JSON schema format). In order to identify key fields, each schema definition can have an additional member (primaryKeys), containing a list of primary key property names.

Figure 3:
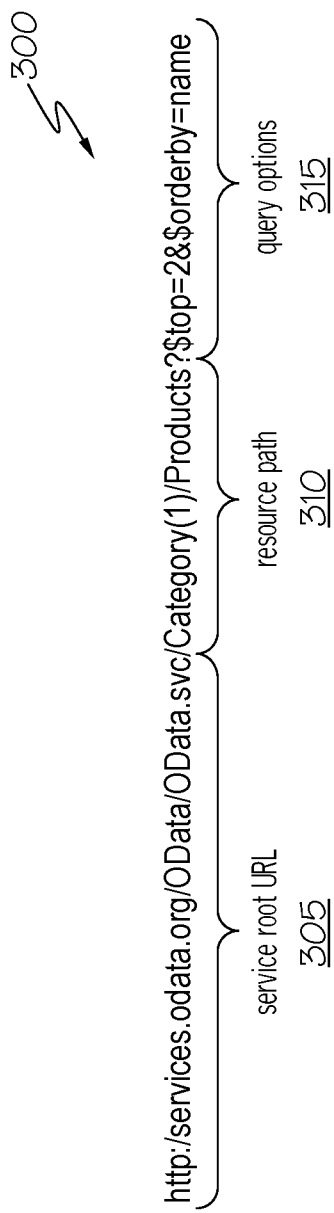
FIG. 3 is an illustration of an uniform resource locator (URL) used in a request of an example software service in accordance with at least one embodiment.

Turning to FIG. 3, an example of a URL request 300 is illustrated. In one example, such as in a request URL of an OData service, a URL request can include a service root URL portion 305, resource path portion 310, and a query option portion 315. The URL request 300 can be structured according to a data service protocol, such as OData. In the case, of an OData URL, the service root portion 305 can identify the root of an OData service (such as an OData service virtualized by a virtual service). The resource path portion 310 can identify the particular resource to be interacted with in connection with the request and can be used to address any aspect of the data model exposed by the corresponding OData service (e.g., collections of entities, a single entity, properties, etc.). The resource path portion 310 can address a collection, single entity, and property of an entity, etc. in accordance with a uniform composable URL syntax (e.g., of OData). For instance, the resource path portion 310 can include addressing operations (e.g., addressing actions and functions) in some instances. The query option portion 315 can specify system and custom query options (such as discussed above) and operation parameters (e.g., filter operations and other operations discussed above), among other examples. Parameters of the query option portion can be utilized to control the amount and order of the data, operations (e.g., mathematical and logical functions) to be performed on the data, and other actions to be performed on the data that an OData service returns for the resource identified by the URL.

Figure 4:
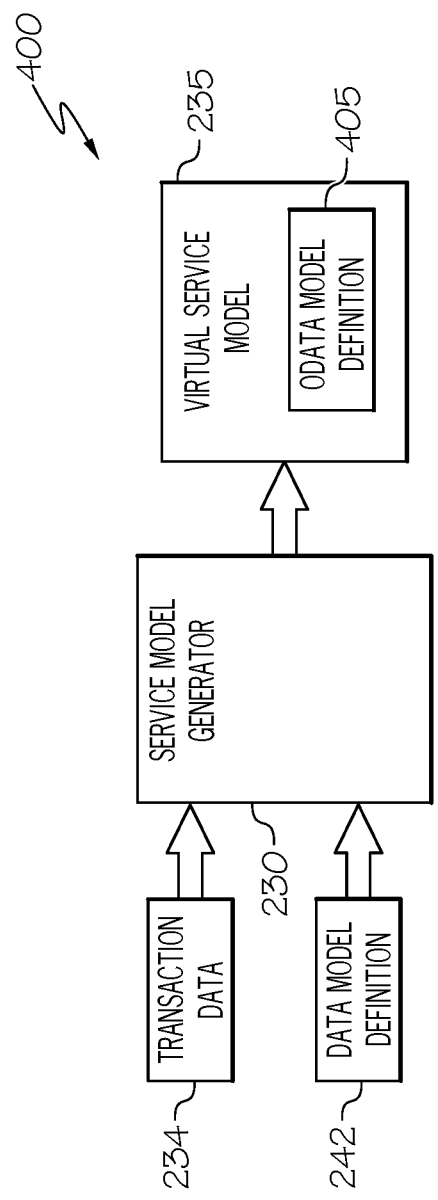
FIG. 4 is a simplified block diagram illustrating an example generation of a service model for use in virtualizing an example data service.

A virtualization system can provide virtual services that can validate and interpret request URLs corresponding to data services modeled by the virtual services. Turning to FIG. 4, a simplified block diagram 400 is shown illustrating an example implementation of a virtual data service. For instance, a service model generator 230 can utilize transaction data 234 and a data model definition 242 as the basis for a virtual service model to model a data service. The transaction data 234 can identify how clients interface with the data service to be modeled, including the structure of requests (e.g., request URLs) and responses by the data service. As noted above, the data model definition can specify the structure, or schema, of the data model utilized by the data service, together with the elements of the data model (e.g., entities, combinations of entities, properties, etc.). The resulting virtual service model 235 can link to or incorporate data model information from the data model definition for reference during operation of a corresponding virtual service. In the example of FIG. 4, an OData model definition 405 is provided that corresponds to a specific OData model to be used by the OData service modeled by the particular virtual service model instance 245.

Figure 5:
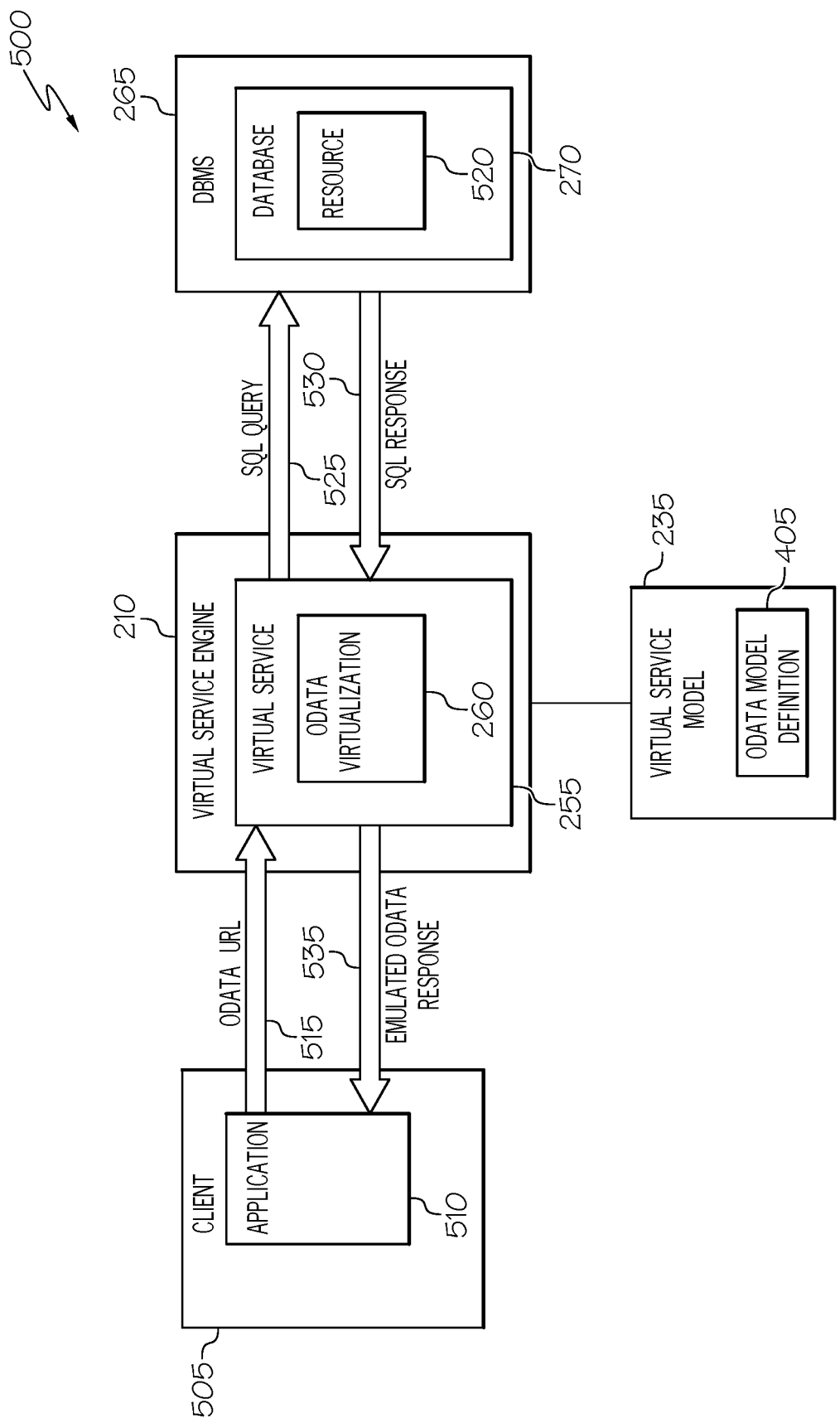
FIG. 5 is a simplified block diagram illustrating an example transaction involving a virtualized dynamic data service.

Turning to FIG. 5, the virtual service model 235 modeling the particular OData service, together with its corresponding OData model definition 405, can be utilized by a virtual service engine 210 to instantiate a virtual service 255 modeling the particular OData service. The virtualization system can incorporate dynamic data service virtualization logic (e.g., either in the virtual service 210 or the virtual service file 255, etc.) which can consume information from the model definition (in this case an OData virtualization manager 260 accessing and consuming information defined within the OData model definition 405) to generate emulated responses of the full real world OData service modeled by the virtual service 255. To illustrate, in one example transaction represented in FIG. 5, an application 510 hosted by a client 505 can send a request 515 (embodied as an OData URL) to an OData service configured to manage the data structure referenced by the request 515. In the case of virtualization, the request 515 can be redirected (e.g., by a network element, testing system, or an agent provisioned on the client (e.g., in connection with the virtualization system)) to the virtual service (e.g., a system (and virtual machine) hosting the instantiation of virtual service 255). Using OData virtualization manager 260, the request URL 515 can be parsed by the virtual service to determine if the request URL 515 agrees with OData syntax. For instance, the virtual service can access OData parser logic to validate that the request URL 515 conforms to the defined OData syntax. The OData virtualization manager 260 can then access the OData model definition 405 corresponding to the service being modeled (and tied to the virtual service's service model 255) to assess the request URL 515 to ensure that its contents (e.g., terms and parameters of the resource path and/or query option portion of the request URL 515 are consistent with the defined data structure. For instance, entity names and relationships included in the resource path or query option portion of the request URL 515 can be compared against the data structure described in the OData model definition 405 to validate the request (or invalidate) the request URL.

If the syntax is incorrect or the terms of the request URL 505 are inconsistent with the model definition, the virtual service 255 can generate an error or alert message as would be expected were a similar error to occur in transactions with the real world data service. In cases where the syntax and terms of the request URL are validated however, the OData virtualization manager, utilizing the OData model definition 405, can translate the request URL into a database query or instruction, such as an SQL query 525, to cause a write, read, or delete to be performed on the database 270 utilized by the virtual service 255 to enable data persistency within the virtualization. A corresponding SQL response 530 can be received from the database host (e.g., a DBMS 265), which is forwarded to the virtual service 255. The virtual service 255, utilizing OData virtualization manager 260 can translate the received database response 530 into an OData response 535 to be returned to the requesting client (e.g., 505). In some cases, at least a portion of a corresponding record of the database used by the virtual service can be encapsulated in the emulated response 535 and returned to the requesting client. For instance, in one example, the OData URL can be interpreted to be a request to write a particular value to a resource (e.g., an OData PUT or POST to a). The resource value can be modeled (e.g., at 520) in the database 270 by one or more database records. The virtual service 255 can translate the request URL into a SQL write request (e.g., an INSERT INTO, UPDATE, or other query), cause the value to be written to the corresponding database record 270 and return an emulated OData response corresponding to the write. Then, if the same (or a different) client sends another request to the same virtual service relating to the same resource, the virtual service can translate the request URL into a corresponding SQL query and perform the SQL query on the same (i.e., previously written-to) database record to allow a data-persistent, emulated OData response to be generated by the virtual service to this subsequent request URL, among other examples.

Figure 6A:
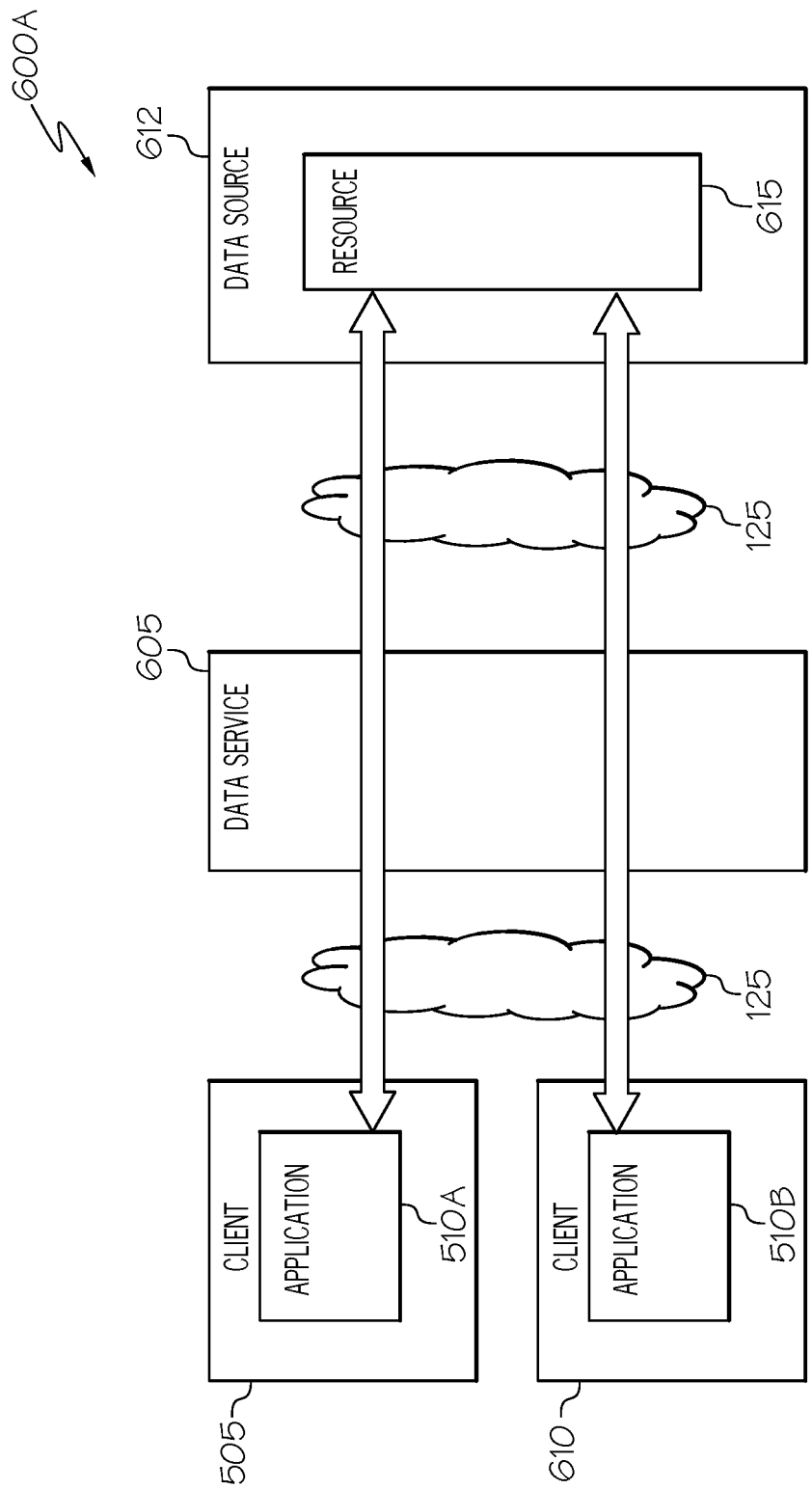
FIG. 6A is a simplified block diagram illustrating an example system including a data service.
Figure 6B:
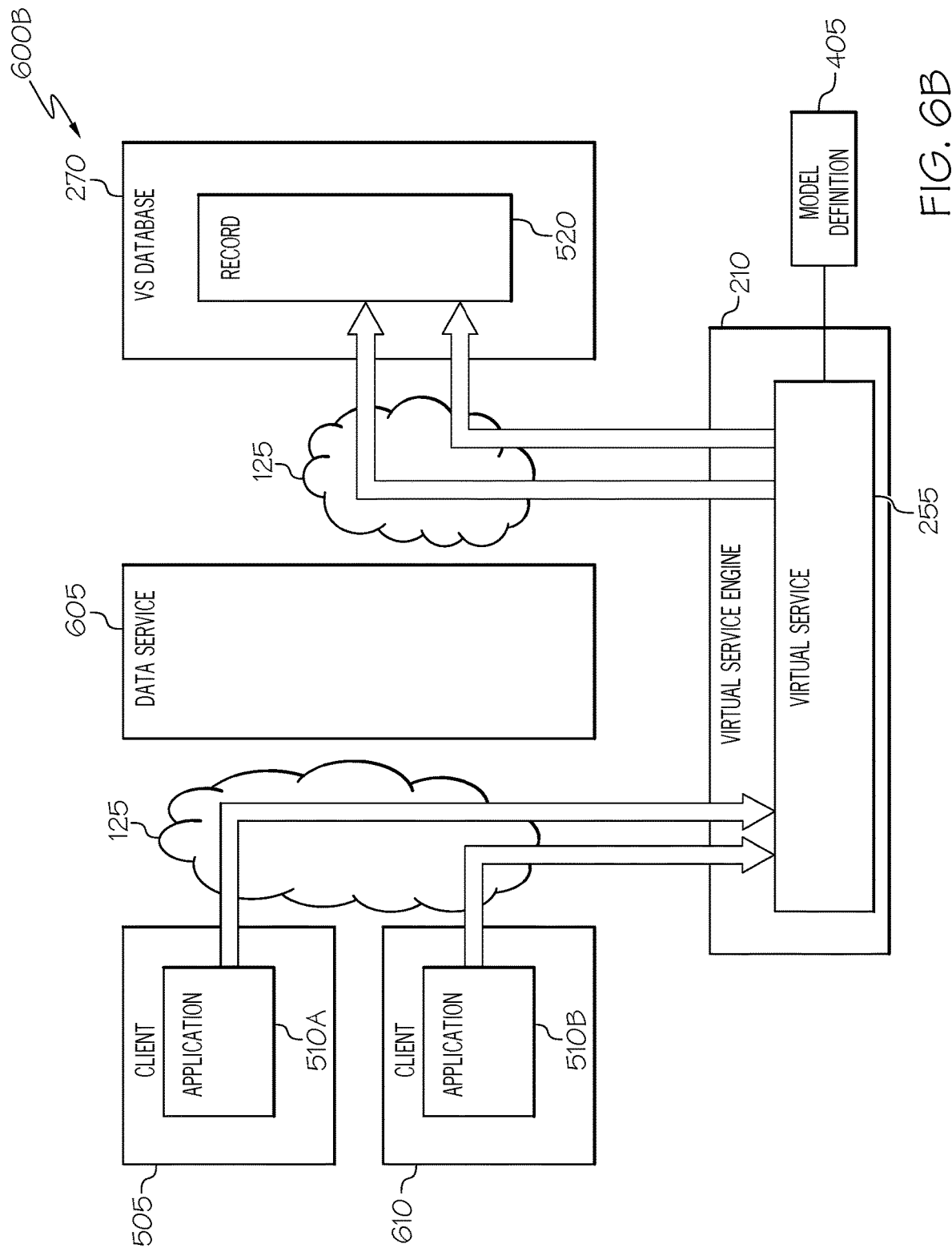
FIG. 6B is a simplified block diagram illustrating virtualization of the example system of FIG. 6A.

Turning to FIGS. 6A-6B, simplified block diagrams 600a-b are shown illustrating virtualization of a system and supported transactions between a data service (e.g., 605) and a plurality of different clients (e.g., 505, 610). In many respects, the examples of FIGS. 6A-6B build upon at least some of the principles illustrated in the preceding examples of FIGS. 4 and 5. A virtual service can be developed for the data service 605 to allow, for instance, tests to be developed that consider multiple transactions between clients (e.g., 505, 610) and a dynamic data service, such as an OData service. In the example of FIG. 6A, an implementation of a real-world data service system is illustrated. The real world data service 605 can be a dynamic data service designed, in development, under test, implemented, or in another state of development. The data service 605 can provide access to a data source 612, such an OData source including a collection of resources (e.g., entities, entity sets, etc.). Various clients (e.g., 505, 610) can interact with the data service 605 over one or more networks (e.g., 125).

As shown in the example of FIG. 6B, the example system of FIG. 6A can be virtualized by providing a virtual service (e.g., 255) to stand-in for the real world data service 605. The data service 605 can be virtualized in instances where access to the data service 605 (and also its corresponding data source(s) (e.g., 612)) is limited or unavailable. Accordingly, the virtual service 255 can be instantiated through a virtual service engine 210 with which client(s) 505, 610 can interact (over network 125) in the stead of the data service 605. The virtual service 255 does not have access to the data source 612, but rather simulates the data service 605 having access to the data source 612. To effectively emulate the data service accessing and performing CRUD operations on a corresponding data source with a defined data model, such that the virtualized data service transactions persist, a database 270 can be provided for use by the virtual service. Further, a model definition 405 can be provided describing the defined data model to the virtual service. Using the model definition 405, the virtual service 255 can translate the request URLs into equivalent SQL queries which can be performed against records (e.g., 520) in the database 270. The written-to records can effectively mimic corresponding resources (e.g., 615) in the real world data source 612. Further, responses to clients' request URLs can be generated by the virtual service based on the results of the transactions with database 270 and can be formatted and sent to emulate the responses of the real world service 605. Further, based on the data persistency enabled through the use of supporting virtual service database 270, subsequent requests received by the virtual service (e.g., from the same or a different client) can reflect values inserted or modified in previous transactions (as defined in corresponding records of database 270), among other example features.

Several examples have been described above to illustrate certain principles and features of the subject matter of this Specification. While the examples above may make reference to certain protocols, systems, components, logic, algorithms, etc., it should be appreciated that the examples above are provided as non-limiting examples. Indeed, alternative implementations can be provided that deviate in some respects from the examples above without falling outside the scope of this Specification. For instance, while certain examples describe the virtualization of data services compliant or consistent with an OData protocol, it should be appreciated that the principles herein can be equally applied to other dynamic data services, among other example alternatives.

Turning to FIGS. 7A-7B, simplified flowcharts 700a-b are shown illustrating example techniques for virtualizing dynamic data services in accordance with the above examples. In the example of FIG. 7A, transaction data can be identified 705 that corresponds to a particular data service to be virtualized. In some cases, at least a portion of the transaction data can be generated in connection with previously-monitored transactions involving the particular data service. Further, at least a portion of the transaction data can be defined in files authored by human users to describe at least a portion of the transactions supported by the data service. A data model definition can also be identified 710 and accessed, which describes the structure, or schema, of the data source of the data service to be modeled. A service model 715 can be generated based on the transaction data and data model definition, which can be used to instantiate a virtual service model to virtualize 720 the particular data service.

In FIG. 7B, a request can be received 725 at a virtual service from a client. The request can be encoded in a URL formatted consistent with a particular data service. The virtual service can verify 730 the syntax of the URL and can further verify 735 consistency of the URL (e.g., its resource path and/or query option portion) with a data model of the data service's data source. Upon verifying the syntax and content of the request URL, the virtual service can translate the content of the request URL into a query to be performed 740 against a database utilized by the virtual service in connection with virtualization of the particular data service. Based on the results returned from the performed 740 query, the virtual service can generate 745 a simulated response of the particular data service, consistent with what would be expected had the real world data service handled the client's request.

The flowcharts and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method comprising:
    receiving a request from a software component at a virtual service simulating a particular data service, wherein the virtual service is instantiated from a service model, the service model is based at least in part on previously observed request-response pairs involving the particular data service, the service model models response behavior of the particular data service to one or more types of requests, the request comprises an uniform resource locator (URL), the URL comprises a service root portion and a resource path portion, and the resource path portion identifies a particular resource of a data structure, wherein the virtual service further comprises a data model corresponding to the particular data service;
    verifying syntax of at least the resource path portion based on a particular protocol using a data model;
    verifying consistency of the resource path portion with a structure of the data model corresponding to the particular data service, wherein the service model identifies the data model;
    performing a query of a database using the virtual service based on contents of at least the resource path portion;
    generating, at the virtual service, a simulated response of the particular data service to the request using results of the query; and
    sending the simulated response to the software component in lieu of an actual response by the particular data service.

2. The method of claim 1, wherein the particular protocol comprises an Open Data (OData) protocol and verifying the syntax comprises determining whether the URL is compliant with OData syntax.

3. The method of claim 2, wherein the simulated response emulates an OData response.

4. The method of claim 1, wherein the URL further comprises a query option portion.

5. The method of claim 4, wherein the query option portion indicates one of an amount of data, an order of data, a filter, and an operator to be applied in a query of the particular resource.

6. The method of claim 1, wherein the resource path portion identifies one of an entity set, entity, and a property of an entity.

7. The method of claim 1, wherein the structure of the data model defines entity sets, entities, and entity properties of the data structure.

8. The method of claim 7, wherein the structure of the data model comprises a plurality of entity sets.

9. The method of claim 7, wherein the structure of the data model defines relationships between a plurality of entities defined in the data structure.

10. The method of claim 7, wherein verifying consistency with the structure of the data model comprises determining whether entities, properties, and relationships indicated in the URL are consistent with entities, properties, and relationships defined in the data model.

11. The method of claim 10, wherein verifying consistency with the structure of the data model is further based on correct ordering of terms in the resource path portion.

12. The method of claim 7, wherein the data model is a particular one of a plurality of data models and the method further comprises identifying that the particular data model corresponds to the particular data service.

13. The method of claim 1, wherein performing the query comprises translating the URL into a Structured Query Language (SQL) query based at least in part on content of the resource path portion and sending the SQL query to a database management system of the database.

14. The method of claim 1, wherein the service root portion corresponds to an address of the particular data service.

15. The method of claim 1, wherein the request is intended for the particular data service and redirected to the virtual service.

16. The method of claim 1, wherein the virtual service stands in for the particular data service.

17. The method of claim 1, wherein the request comprises a first request and the first request comprises one of a create, update, or delete request and performing the query modifies the particular resource.

18. The method of claim 17, further comprising:
    receiving a second request at the virtual service, the second request comprising a URL identifying the particular resource;
    verifying syntax of the URL of the second request;
    verifying consistency of the URL of the second request with the structure of the data model corresponding to the particular data service; and
    performing another query of the database based on contents of the URL of the second request, wherein the other query is directed to the modified particular resource; and generating another simulated response of the particular data structure to the second request based on results of the other query.

19. A non-transitory computer readable medium having program instructions stored therein, wherein the program instructions are executable by a computer system to perform operations comprising:

receiving a request from a software component at a virtual service, wherein the virtual service simulates particular data service, the virtual service is instantiated from a service model, the service model is based at least in part on previously observed request-response pairs involving the particular data service, the service model models response behavior of the particular data service based on the previously observed request response pairs, the request comprises an uniform resource locator (URL), the URL comprises a service root portion and a resource path portion, and the resource path portion identifies a particular resource of a data structure;

verifying, at the virtual service, syntax of at least the resource path portion based on a particular protocol;

verifying, at the virtual service, consistency of the resource path portion with a structure of a data model corresponding to the particular data service, wherein the service model identifies the data model;

performing, using the virtual service, a query of a database based on contents of at least the resource path portion;

generating, at the virtual service, a simulated response of the particular data service to the request using results of the query; and sending the simulated response from the virtual service to the software component in lieu of an actual response by the particular data service.

20. A system comprising:
a data processor;
a memory, wherein the memory stores a virtual service model;
a database; and
a virtual service engine to host a virtual service simulating a particular data service, wherein the virtual service is derived from the virtual service model, the virtual service model comprises a definition of a particular data model of the particular data service, and the virtual service is to:

receive a request comprising an uniform resource locator (URL), the URL comprises a service root portion and a resource path portion, and the resource path portion identifies a particular resource of a data structure;

verify syntax of at least the resource path portion based on a particular protocol;

verify consistency of the resource path portion with a structure of the particular data model corresponding to the particular data service;

perform a query of the database based on contents of at least the resource path portion;

generate a simulated response of the particular data service to the request using results of the query; and send the simulated response to a software component in lieu of an actual response by the particular data service.

* * * * *

UNITED STATES PATENT AND TRADEMARK OFFICE
CERTIFICATE OF CORRECTION

PATENT NO. : 10,628,420 B2
APPLICATION NO. : 14/974098
DATED : April 21, 2020
INVENTOR(S) : John Devine et al.

It is certified that error appears in the above-identified patent and that said Letters Patent is hereby corrected as shown below:

In the Claims

Column 27, Line 9 (Claim 19): Add --a-- before "particular".

Signed and Sealed this
Fourteenth Day of July, 2020

Andrei Iancu
*Director of the United States Patent and Trademark Office*